United States Patent
Cavey

(10) Patent No.: US 7,966,254 B2
(45) Date of Patent: Jun. 21, 2011

(54) METHOD AND SYSTEM FOR CREDIT DECISIONING USING ACTIVITY BASED COSTING AND COMPARTMENTAL MODELING

(75) Inventor: Daniel J. Cavey, Ponte Vedra Beach, FL (US)

(73) Assignee: Bank of America Corporation, Charlotte, NC (US)

( * ) Notice: Subject to any disclaimer, the term of this patent is extended or adjusted under 35 U.S.C. 154(b) by 1935 days.

(21) Appl. No.: 10/353,306

(22) Filed: Jan. 29, 2003

(65) Prior Publication Data

US 2004/0153397 A1 Aug. 5, 2004

(51) Int. Cl.
*G06Q 40/00* (2006.01)
*G06Q 10/00* (2006.01)
(52) U.S. Cl. .................. 705/39; 705/38; 705/7.11
(58) Field of Classification Search .................. None
See application file for complete search history.

(56) References Cited

U.S. PATENT DOCUMENTS

| | | | | |
|---|---|---|---|---|
| 5,970,478 A * | 10/1999 | Walker et al. | ............ | 705/35 |
| 6,202,053 B1 * | 3/2001 | Christiansen et al. | ......... | 705/38 |
| 7,319,985 B2 * | 1/2008 | Siska | ............ | 705/38 |
| 7,660,734 B1 * | 2/2010 | Neal et al. | ............ | 705/10 |
| 2002/0178113 A1 * | 11/2002 | Clifford et al. | ............ | 705/39 |
| 2003/0046130 A1 * | 3/2003 | Golightly et al. | ............ | 705/7 |
| 2004/0111363 A1 * | 6/2004 | Trench et al. | ............ | 705/39 |
| 2004/0128236 A1 * | 7/2004 | Brown et al. | ............ | 705/39 |

OTHER PUBLICATIONS

Leon H. Liebman, "A Markov Decision Model for Selecting Optimal Credit Control Policies", Jun. 1972, Management Science, vol. 18, No. 10, pp. B519-B525.*
John A. Jacquez, "Compartmental Analysis in Biology and Medicine: Kinectics of Distribution of Tracer-Labeled Materials", 1972, Elsevier Pub. Co., 2nd edition, pp. 1-2, 20-21, 309-316, and 362-363.*

* cited by examiner

*Primary Examiner* — Charles R Kyle
*Assistant Examiner* — Irene Kang
(74) *Attorney, Agent, or Firm* — Michael A. Springs; Moore & Van Allen PLLC; Andrew L. Haynes

(57) ABSTRACT

Method and system for credit decisioning using activity based costing and compartmental modeling. Credit product profitability for a financial institution using credit scorecards is improved by providing an analysis that results in a recommended credit cutoff score for a particular loan product. The selected cutoff score is determined with input including pass and bad rate parameters for the pertinent scorecard, workflow analysis for the loan process, compartmental modeling of the workflow, and activity based costing (ABC) for the workflow. In some embodiments, data related to portions of the analysis for a particular scorecard is saved for re-use, so that a new cutoff score for a particular type of loan can be determined relatively quickly and easily if only the financial institution's costs have changed.

32 Claims, 6 Drawing Sheets

FIG. 1
Prior Art

| Score | #Apps | Cumtv # | Cumtv % | Bad rate | # Bads | Cumtv Bads (%) |
|---|---|---|---|---|---|---|
| <130 | 9392 | 50,000 | 100.0% | 20.3% | 1902 | 9.2% |
| 135 | 8221 | 40,608 | 81.2% | 15.8% | 1297 | 6.9% |
| 140 | 6712 | 32,387 | 64.8% | 12.8% | 857 | 5.2% |
| ... | ... | ... | ... | ... | ... | ... |
| 235 | 2 | 2 | 0.0% | 0.0% | 0 | 0.0% |
| 240 | 0 | 0 | 0.0% | 0.0% | 0 | 0.0% |

METHOD AND SYSTEM FOR CREDIT DECISIONING USING ACTIVITY BASED COSTING AND COMPARTMENTAL MODELING

BACKGROUND

Loaning money is a central process in the banking industry. The process banks follow when making a decision as to whether or not to loan money to an entity or individual is often related to a credit score. In a typical scenario, a bank scores the applicant and compares that score to some pre-determined cutoff score. The applicant's score is determined by several factors depending the type of credit requested, but once the method of determining an applicant's score is chosen, it is typically applied uniformly for that type of loan. In addition, the cutoff score is determined for each type of credit offered by the bank. Often, the cutoff score is determined based on a relatively subjective understanding of business conditions, and is updated only as business conditions change significantly.

The credit scoring process results in a number (in practice, an integer) that represents the credit worthiness and credit history of the applicant. The process of determining the applicant's credit score is deterministic and can be viewed for purposes of this disclosure as a known parameter or constant. The cutoff score, by contrast, is typically an arbitrary number derived by some methodology to help the bank achieve its business goal. The cutoff score is chosen with the help of a credit scorecard (in chart or table form) that is developed using a broad range of industry data about "pass" rates and "bad" rates for a particular type of loan. In most cases, the bank's goal in choosing a cutoff score is to maximize profit by balancing loan volume and loan quality with the loss that results from making bad loans.

In its basic form, a credit scorecard has a list of scores in sequence, an estimation of what percentage of the universe of all applicants will have scores above that score (pass rate), and an estimation of what percentage of the universe of loans to applicants with scores above that cutoff score that will go delinquent sometime during the life of the loan (bad rate). A portion of a hypothetical scorecard 100 is illustrated in FIG. 1. The central rows of the scorecard are omitted for clarity. Column 102 shows the scores, column 104 shows the number of applications in the sample on which the scorecard is based that fall into the score range identified by the score, column 106 shows the cumulative number, and column 108 shows the cumulative percentage (pass rate). Columns 110, 112, and 114 show the percent bad rate, number of bad applications, and cumulative percentage of bad applications (bad rate) for a score, respectively. Note that the first row includes all scores below a particular score, which has been identified as the lowest score the bank is interested in with respect to potential loan candidates.

Credit scorecards for various types of loans are typically developed by independent credit agencies, such as Fair, Isaac & Company, Inc. These scorecards are kept confidential, but sold or licensed to banks for a fee under condition of confidentiality. Sometimes, a particular credit agency's scorecards will contain additional data pertaining to information that is maintained and studied "exclusively" by the particular credit agency. In any case, the general format, use, and meaning of credit scorecards are well understood by individuals in the financial loan industry.

SUMMARY

The present invention provides a way, possibly with the aid of data processing resources, to substantially maximize a credit product's profitability for a financial institution using credit scorecards. Using the invention, business professionals at a financial institution can make cutoff score decisions with more certainty, on a repeatable, reliable basis than has been previously possible. The cutoff score is determined with input including pass and bad rate parameters or functions for the applicable scorecard, workflow analysis for the loan process, compartmental modeling of the workflow, and activity based costing (ABC) for the workflow. In some embodiments, data related to portions of the analysis for a particular scorecard is saved for re-use, so that a new cutoff score for a particular type of loan can be determined relatively quickly and easily if the only condition that has changed is the bank's cost.

Initially, a compartmental model of the workflow for processing a particular type of loan is developed by the financial institution's personnel. The workflow model in some embodiments includes a cost template vector. The development of this compartmental workflow model may take some effort; however, the workflow is typically fixed over long periods of time so that the effort is not expended often. In order to then select a credit decision cutoff score from the credit scorecard to be used in a credit decisioning process for a particular type of loan, rate parameters are developed for the credit scorecard pass and bad rates. In some embodiments, pass and bad rates are functions of cutoff score, and this is done using regression analysis. The compartmental workflow model and the rate functions are then analyzed to produce a maximum profitability function and an activity based costing (ABC) ratio constant generating function. The maximum profitability function defines a maximum profitability curve. In some embodiments this analysis includes developing transfer coefficients and occupancy values for the compartments in the model so that a transfer coefficient matrix and an occupancy matrix can be populated and used for the analysis. Finally, an ABC ratio, normally a constant, is determined using activity based costs for the model. The ABC ratio is then looked up on the maximum profitability curve, and the matching cutoff score, being the substantially most profitable cutoff score, is identified as the credit decision cutoff score. In some embodiments the maximum profitability curve can be inverted and the cutoff score can be determined directly. Furthermore, in some embodiments, the ABC ratio can be determined as a function of one or more other variables, such as the income generated in a particular compartment of the compartment model, to facilitate study of the affects of the other variable on the business.

In some embodiments, data is held within a data store, which describes the maximum profitability curve and the ABC ratio constant generating function. In effect, the analyzing of the workflow and the scorecard to determine the maximum profitability curve and the ABC ratio constant generating function is performed by a first subsystem within the system of the invention. Then, the identification of the substantially most profitable cutoff score as the credit decision cutoff score is performed by a second subsystem using the stored data, the template vector, and the activity based costs for the various activities in the compartmental workflow model. Such a system allows a new, substantially most profitable cutoff score to be identified relatively easily and quickly when costs of one or more of the activities in the workflow model change.

Substantial portions of the method of the invention are typically implemented on a computer system running a computer program product. In some cases, multiple computer systems may be connected, each residing at a node of a network. For example, a data store may be located at one node of a network, and a workstation in which costs are input and a cutoff score recommendation is retrieved may reside at another node of the network. In any case, the computer program product, processing platform hardware, memory or storage media, and other hardware and software used to implement the invention form the means for carrying out the processes of the specific embodiments disclosed.

BRIEF DESCRIPTION OF THE DRAWINGS

FIG. 1 is a representation of a credit scorecard of the type that might find use with embodiments of the present invention.

DETAILED DESCRIPTION OF ONE OR MORE EXAMPLE EMBODIMENT(S)

Figure 2:
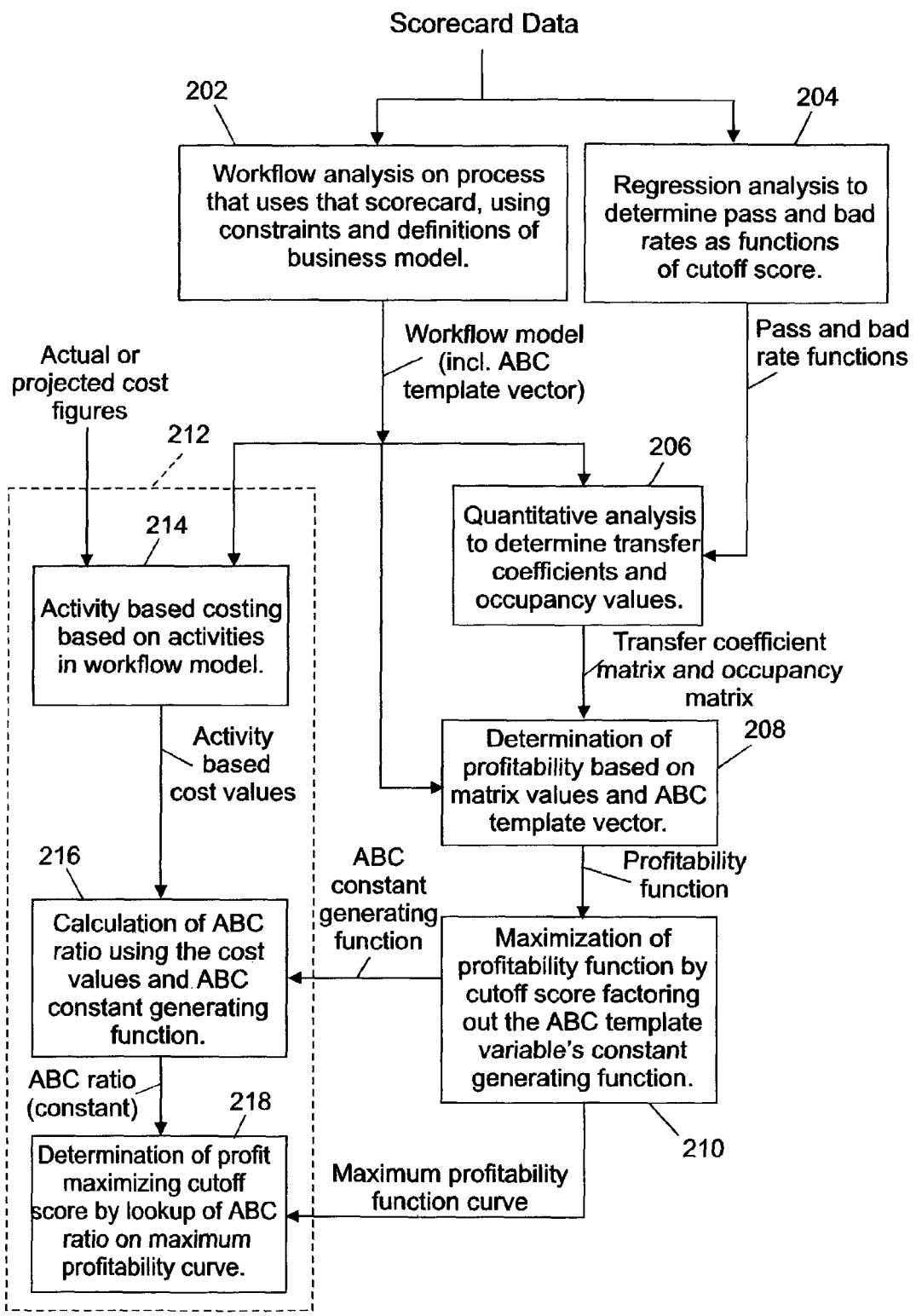
FIG. 2 is a flow diagram illustrating the method of embodiments of the invention.

The invention will now be describe in terms of detailed embodiments. These embodiments are given by way of example, and those of ordinary skill in the art will recognize that there are other embodiments, which may be implemented without departing from scope of the appended claims. The first portion of this description will lay out the theoretical framework of the invention. Next, a detailed example will be presented. Finally, the implementation of a practical tool to implement the invention in an actual financial enterprise will be discussed.

At certain places in this disclosure, reference is made to a "substantially most profitable cutoff score." The reference is meant to recognize that neither business behavior nor financial data are perfect, and that certain assumptions and approximations are made in the creation of workflow models and the carrying out of other elements of the methods disclosed. Thus, a most profitable cutoff score returned by a system according to the invention may not strictly in reality be the most profitable, but will be close enough to the actual most profitable score for normal business purposes on a repeatable basis. Thus scores produced using the invention represent an improvement over determinations made by subjective, prior art methods.

It also must be noted that the profit for a particular loan business at the most profitable cutoff score may in fact be negative, representing a loss. Thus, maximizing profit is actually minimizing loss. There are many business situations where a financial institution will want or need to operate a particular loan business at a loss for some period of time rather then get out of that particular business. Terms such as "maximizing profit," "profit maximization," "most profitable" and the like as used herein are intended to encompass both maximizing profit and minimizing loss, depending on the particular situation.

The profitability model on which the invention is, at least in part, based merges two models. As a result, it produces a profitability function that can then be implemented to determine maximum profitability. The two models used are a business model and a compartmental Model. The business model is produced through workflow analysis in such a way that the results can be applied to compartmental modeling. The type of business modeling involved is not unusual, however, compartmental modeling is a technique commonly applied in the area of pharmacokinetics. As such a compartmental model heretofore has been most typically used to model the processing of pharmaceuticals by the organs of the body.

The business model reflects both the need to properly define the business from a workflow perspective and the need to have the model be adaptable to the compartmental modeling technique. The business model is presented in the form of several definitions and assumptions.

Definition 1: The term "credit process" or "loan process" or "credit decisioning process" is a process that represents the life of the loan. This includes any work done in the credit or lending process from receipt of the application until the bank or applicant no longer has interest in the loan, or until all financial obligations have been completed.

Definition 2: The term "credit" can mean either or both of the application for credit and the loan itself.

Definition 3: Activity based costing (ABC) is a cost accounting technique used as an alternative approach to standard organizational cost accounting. It involves looking at the cost of a particular activity no matter which organizations within an enterprise are involved with getting that activity accomplished. For example, a particular activity might involve work from both the sales and operations parts of an organization. Although ABC is typically thought of, and presented in the examples herein, as based on monetary costs, the present invention will-work where ABC reveals "costs" in terms of any measurement attribute for motion through the process flow. Thus, ABC could be done in terms of hours worked, applications processed or not processed, etc. The credit decisioning process workflow is the foundation of the business model and the ABC. There are three criteria that should be met by the workflow analysis on the credit process that leads to the business model.

i. It should be detailed enough to allow for good ABC of individual component processes or activities, but not so complicated as to make the ABC of those component processes cost prohibitive.

ii. The component processes should represent a defined state through which the credit passes. That is, it should be possible to enumerate the number of credits that are in that process at any time.

iii. The rate of flow between the component processes or activities should be known or estimable. Since this is a workflow model, there is by definition a flow of work. The work in this case is credit and the flow is the number of credits that move between activities in any particular time period, or a rate at which the credits move between activities or component processes. Therefore, the number of credits in an activity at any time can be enumerated.

Definition 4: The term "compartment" represents an activity or component process in the business model workflow. This term is used for consistency of terminology with what is typically used in compartment modeling. The business model has N compartments where N is an integer.

Definition 5: The terms "transfer coefficient," "rate of flow" and "rate of exchange" are used interchangeably depending on the context. Transfer coefficient is the terminology used with compartmental modeling; $k_{ij}$ is the transfer coefficient defining the "rate of flow" to compartment i from compartment j, $1 \leq i,j \leq N$. If the transfer coefficient is dependent on the cutoff score s then it is written $k_{ij}{}^s$. Unless the context requires otherwise, $k_{ij}{}^s$ will be used herein. The transfer coefficients, $k_{ij}{}^s$, will be defined as a proportion of all input entering the process that will move between compartments i and j. Because of this, they are also the probability that a unit input injected into the beginning of the process moves between compartments i and j, so $0 \leq k_{ij}{}^s \leq 1$, $1 \leq i,j \leq N$.

Definition 6: "Profitability coefficients," $\tilde{C}$ make up a vector that results from ABC of the business model, where $\tilde{C}$ is a 1×N vector with elements $c_i$, where $c_i \in \Re$, i=1, . . . ,N, and each $c_i$ corresponds to one and only one compartment in the business model.

Definition 7: The "profitability model" is a model that defines profitability in terms of "profit per credit," or the profit or loss to the business for processing one unit of credit.

Business does not run in a perfectly theoretical manner, therefore certain assumptions are made in order for the model to be as useful as possible.

Assumption 1: The $k_{ij}{}^s$ are independent of time and independent of the state of a compartment, that is independent of the quantity in a compartment at any time. There could be seasonal and time of day fluctuations in the rate of flow between some or all activities, but the invention would most likely be used to effectuate long run profitability of the process as determined by information from a scorecard. The typical banking industry assumptions are that these types of workflow rates are not time dependent over long periods of time. In addition, the decisions that cause credit to flow from one activity to another are either dependent on policies, which are independent of the number of credit units present, or are dependent on a specific applicant which is unaware of the state of the compartment.

Assumption 2: The elements of $\tilde{C}$ are assumed to be deterministic in the context of the profitability model. While there may be some situations that result in random variability in cost determination, these are values to be determined from financial or business data, not estimations.

Assumption 3: The model is defined based on a unit input of credit inserted into the starting point of the workflow process. While there may be different methods of starting a credit request in the credit process (internet application, mail, banking center, and personal solicitation are a few examples), this model is concerned with the process once the credit application is in the queue to be decisioned.

Assumption 4: The pass rate, $k_{(p)ij}{}^s$ and bad rate, $k_{(b)ij}{}^s$, are both considered deterministic and not estimates. The scorecard is typically a purchased product from a third party and is fixed from the perspective of the user of the invention.

Compartment modeling is a well-known technique that involves setting up the "thing" or process to be modeled as a set of N compartments. The model then characterizes the flow or lack of flow of "items" or units between compartments. These rates of exchange or "transfer coefficients," $k_{ij}{}^s$ may be constant, a function of time, a function of the quantity in a compartment at any time, or a function of something outside the system itself. For more information on this type of modeling, see Jacquez, *Compartmental Analysis in Biology and Medicine*, Third Edition, BioMedware, 1996, which is incorporated herein by reference.

The compartmental model to be used in the disclosed embodiments of the invention assumes injection into the system at the first compartment, and that all transfer coefficients are constant with respect to time and compartment size (size being the quantity of items in the compartment). It is also assumed that all credit eventually leaves the system. The model characterizes the total proportion $q_{s(i)}$, i=1, . . . ,N, of all credit that passes through each compartment in the model for any particular cutoff score s.

For a given cutoff score, s, let $\tilde{q}_s$ be defined as the N×1 column matrix (or vector) where each element (row) represents the number of items that pass through compartment i over all time, i=1, . . . N. This is also known as the total occupancy of the compartment for a given cutoff score, s. When the system or model is "injected" with unit input at the starting compartment of the business model's workflow, then $\tilde{q}_s$ becomes the proportion of unit input that passes through that compartment.

Let $\tilde{q}_s(0)$ be defined as the initial value N×1 column matrix (or vector) representing the initial "injection" into, or state of, the system for a given cutoff score, s. Based on Assumption 3, the initial value matrix for the compartment model is $\tilde{q}_{s(i)}(0)=1$ and $\tilde{q}_{s(i)}(0)=0$, i=2, . . . ,N. This can also be written as:

$$\tilde{q}_s(0) = \begin{bmatrix} 1 \\ 0 \\ \vdots \\ 0 \end{bmatrix},$$

or the unit input into compartment one.

Let $\tilde{K}_s$ be defined as the N×N matrix of the $k_{ij}{}^s$. Where $k_{ij}{}^s$ is the rate of flow from compartment j to i for all i≠j, and for i=j, $k_{ij}{}^s$ is the sum of all rates of flow out of compartment i. Because $k_{ij}{}^s$ is an outflow it is represented as a negative number, $-1 \leq k_{ij}{}^s \leq 0, \forall i$. As will be discussed in further detail later, each compartment in this implementation of the model has two outflows by which all units must eventually pass. In addition, there are not feedback loops and all units end up in a termination compartment, allowing $\tilde{K}_s$ to be defined as a lower diagonal matrix with −1 in all diagonal entries. That is, $k_{ij}{}^s = -1, \forall i$.

Following through in compartmental analysis:

$$\tilde{q}_s(t) = e^{\tilde{K}_s \cdot t} \cdot \tilde{q}_s(0)$$

or the quantity in all compartments at any time, t. Integrating across all time will produce the desired quantity, which is the total occupancy of all compartments as is shown in the calculations below. $\tilde{q}_s$ is called the "occupancy vector" or "occupancy matrix" and can be thought of as the total number of units that pass through a compartment across all time for any given "injection" of input into the system. In the context of the present model, this will be the proportion of unit input that passes through a compartment, since unit input into the first compartment is being used.

A convenient computational form can be derived by starting with the equation:

$$\tilde{q}_s = \int_0^\infty e^{\tilde{K}_s \cdot t} \cdot \tilde{q}_s(0) dt = [\int_0^\infty e^{\tilde{K}_s \cdot t} dt] \cdot \tilde{q}_s(0).$$

Jacquez presents the following derivation from the above equation:

$$\int_0^t e^{\tilde{K}_s \cdot r} dr = \int_0^t \left[ I + \tilde{K}_s r + \frac{\tilde{K}_s^2 r^2}{2!} + \ldots \right] dr$$

$$= It + \frac{\tilde{K}_s t^2}{2!} + \ldots$$

-continued $$= \tilde{K}_s^{-1}\left[\tilde{K}_s t + \frac{\tilde{K}_s^2 t^2}{2!} + \ldots\right]$$

$$= \tilde{K}_s^{-1}\left[e^{\tilde{K}_s t} - I\right]$$

and since, $$e^{\tilde{K}_s t} \to 0, \text{ as } t \to \infty,$$

$$\int_0^\infty e^{\tilde{K}_s \cdot t} dt = -(\tilde{K}_s^{-1}).$$

This leads, relying on the Taylor expansion of the definition of e raised to a power that is a matrix, to the convenient computational form:

$$\tilde{q}_s = -(\tilde{K}_s^{-1}) \cdot \tilde{q}_s(0).$$

A profitability model is the result of the proper application of the ABC coefficients $\tilde{C}$ with the total occupancy vector $\tilde{q}_s$. The profitability function will be based on these two vectors which are at least in part based on an analysis of the compartmental workflow model and the credit scorecard data, consisting in this embodiment of the pass and bad rate functions for the scorecard. The maximization of the profitability function will determine a maximum profitability function curve. Because of the relationship of the ABC coefficients and the total occupancy vector to the business model, the product of these two vectors will be a profit equation for a unit credit across all defined values of the cutoff score, s, as shown by:

$$p(s) = \tilde{C} \cdot \tilde{q}_s.$$

As stated earlier, the scorecards provide two of the transfer coefficients, $k_{(p)}^s$ and $k_{(b)}^s$, which are known. In the example embodiments here, the rate coefficients are functions of s. However, there may be situations where pass and/or bad rates for a particular type of loan are constant with respect to s, especially if a business is only interested in a small range of s. In such a case, one or both of these coefficients, also referred to herein as "rate functions" or "rate parameters," is simply a constant. Terms such as "rate function" and "rate parameter" are intended herein to encompass this possibility. In the case of constant rate parameters being used for these transfer coefficients, many of the calculations herein become simpler. Also, the other transfer coefficients are unknown and random in nature. Because of these two attributes, the polynomial resulting from the equation above can be written as:

$$p(s) = (k_b^s k_p^s)\alpha + (k_b^s)k_v\alpha + (k_p^s)\beta + \gamma$$

$$= k_b^s(k_p^s + k_v)\alpha + k_p^s \beta + \gamma.$$

Where,
  i. $k_{(p)}^s$ and $k_{(b)}^s$ are as defined earlier.
  ii. $\alpha$, $\beta$, and $\gamma$ are functions of $\{k_{ij}\}$, and $\{c_i\}$, $1 \leq i,j \leq N$, where $k_{(p)ij}^s, k_{(b)ij}^s \notin \{k_{ij}\}$.
  iii. $i_b j_b$ and $i_p j_p$ are the subscripts of $k_{(p)ij}^s$ and $k_{(b)ij}^s$ respectively and assuming a placement in the compartment model so that $i_p < i_b$ and $j_p < j_b$, then $k_v$ is a function of $\{k_{ij}\}$, for $i_p < i < i_b$, and $j_p < j < j_b$. (The argument will work in reverse as well, but for consistency pass rate coefficient is used before the bad rate coefficient throughout.)

Intuitively, one can see that $k_v$ is a function of the transfer coefficients that define the flows to the bad rate that do not also effect the pass rate. If either of those constraints for i or j do not hold for $k_v$ then $k_v$ does not exist and the equation is:

$$p(s) = k_b^s k_p^s \alpha + k_p^s \beta + \gamma.$$

For purposes of the invention, profitability needs to be maximized based on the cutoff score. Here, p(s) is continuous over the range which is of interest, as long as all $k_{ij}^s$ are continuous, which is the case based on the definitions. To maximize the profitability, p(s) is differentiated with respect to s. Setting to 0 and solving reveals the maxima(s) for p(s), therefore:

$$\frac{d}{ds}(p(s)) =$$

$$\frac{d}{ds}(k_b^s(k_p^s + k_v)\alpha + k_p^s \beta + \gamma) = \frac{d}{ds}(k_b^s k_p^s \alpha) + \frac{d}{ds}(k_p^s \beta) + \frac{d}{ds}(\gamma) = 0,$$

so, $$\alpha k_b^s k_p^{s\prime} + \alpha k_b^{s\prime} k_p^s + \alpha k_v k_b^{s\prime} + \beta k_p^{s\prime} = 0,$$

and, $$\frac{\alpha}{\beta} = \frac{-k_p^{s\prime}}{k_p^{s\prime} k_b^s + k_b^{s\prime} k_p^s + k_b^{s\prime} k_v} = \frac{-k_p^{s\prime}}{k_p^{s\prime} k_b^s + k_b^{s\prime}(k_p^s + k_v)}$$

The above equation allows for interpretation in context with the business model, resulting in a function of costs from the ABC, $f(\tilde{C})$ equated to a maximum profitability function curve g(s), which is:

$$f(\tilde{C}) = g(s).$$

g(s) is determined by the scorecard transfer coefficients, $k_{(p)ij}^s$ and $k_{(b)ij}^s$. If $k_v$ exists then, g(s) also contains process (that is, non-scorecard) transfer coefficients. $f(\tilde{C})$ is determined by the process transfer coefficients only. In some embodiments $f(\tilde{C})$ can be written in matrix algebra form. The coefficients and form of both $f(\tilde{C})$ and g(s) are results of the computations done using the compartment model, thus written in computational form:

$$g(s) = \frac{(-1)\frac{d}{ds}(k_p^s)}{\frac{d}{ds}(k_b^s k_p^s) + k_v \frac{d}{ds}(k_b^s)},$$

and $$f(\tilde{C}) = \frac{\alpha}{\beta},$$

where $\alpha$ and $\beta$ are functions of $\{k_{ij}\}$, and $\{c_i\}$, $1 \leq i,j \leq N$ as defined above.

Relating this back to the business model one can see that the following statements hold with regards to the profitability model and it's relationship to the business model.
  i. $\tilde{C}$ changes only with changes to ABC analysis.
  ii. $f(\tilde{C})$ changes with changes to the process transfer coefficients.
  iii. g(s) changes with changes to the scorecard, and if $k_v$ exists, it changes with the process transfer coefficients, as well.
  iv. $f(\tilde{C})$ and g(s) change with changes to the workflow analysis. Finally, $$s = g^{-1}(f(\tilde{C})).$$

According to the above equation, the cutoff score that yields maximum profitability for a given workflow and scorecard is completely dependent on the ABC analysis. This dependency allows a business to perform ABC iteratively as it experiences continuous changes in cost considerations and cost measures. The result of these changes is a change in the cutoff score that maximizes the profitability. One can also see that g(s) is a function of the good and bad rates from the scorecard. Thus, a maximum profitability formulation can be created for each scorecard of interest, that is, for each type of loan business. Note that in the examples presented herein, only the pass and bad rate function coefficients are functions of cutoff score. It is important to recognize that the invention works equally well if other matrix coefficients are functions of cutoff score. Such may be the case, for example, if the application handling process for a compartment is adjusted depending on the applicant's score.

With an understanding of the theory above, one can appreciate the overall process for determining a most profitable cutoff score as illustrated in FIG. 2. Note that FIG. 2 includes legends that show what is being passed from one process to the next in terms of input and output. Workflow analysis is performed on the process for the particular type of loan at step 202, possibly using basic information about the scorecard to fully understand the process. This workflow analysis uses the constraints and definitions from the business model. Scorecard data is also used in this embodiment, as shown at step 204, to determine pass and bad rate functions for the scorecard of interest. In the case where pass and bad rates are functions of cutoff score, as in this embodiment, regression analysis is used. In a case where pass and bad rates are constants relative to cutoff score, determining the rate parameters simply involves ascertaining the constant values, which might be provided directly. The workflow model, including an ABC template vector, and the credit scorecard rate functions are analyzed to produce transfer coefficients and occupancy values at step 206. The profitability function is produced at step 208, through additional analysis using the transfer coefficient matrix, the occupancy matrix, and the workflow model and the rate functions. The profitability function is maximized to produce a maximum profitability function, and the ABC constant generating function is factored out at step 210. The maximum profitability function defines a maximum profitability curve.

Note that the steps above produce a maximum profitability function and an ABC constant generating function that are independent of actual cost figures. These functions are in effect produced using the compartmental workflow model and scorecard data comprising pass and bad parameters, which do not include any actual cost figures. Cost figures are used in the part of the process that is within box 212 of FIG. 2. The delineation between two parts of the process has practical implications that will be discussed near the end of this disclosure in presenting a practical implementation of a system employing the invention for use by financial institutions.

Turning to the costing portion of the process, ABC costing for the various activities in the loan process is performed using the workflow model and cost figures at step 214. The activity based cost values are plugged into the ABC constant generating function at step 216. An ABC ratio is produced (since the function equation is in the form of a ratio). In most embodiments, this ratio will be a numerical constant value. However, it is possible to have it be a function of another variable if not all the costs can be obtained due to some uncertainty. This possibility is discussed further with respect to the specific cost example, below. Finally, at step 218, this value is found on the maximum profitability function curve, and the corresponding cutoff score, s, is the maximum profitability (or minimum loss) cutoff score. As a practical matter, this step can be performed graphically, either manually or by machine, or through mathematical means such as curve fitting, regression, analysis, plugging each possible value of s into the function in turn, etc. Terminology such as "looking up," "identifying," "locating," and similar terms relative to the maximum profitability curve are intended to encompass all these possibilities for locating the maximum profitability cutoff score defined by the maximum profitability function.

In order to facilitate an understanding of the invention, an example problem with a workflow analysis and compartment model, and example activity based costs will now be presented. For purposes of this example, assume the business is a bank with a business model according to the constraints, definitions and assumptions presented earlier. Assume a credit process workflow that can be modeled with a ten-compartment model. The compartmental model has the following attributes:
  i. All flows from a compartment (other than output compartments) are binary, that is the flow is to one of two other compartments.
  ii. There are no flows that return back to a previous compartment, that is there are no feedback loops.
  iii. Input is into one compartment and there are multiple (in this case four) output compartments by which credit leaves the system.
  iv. Over time all inputs leave the system.

Figure 3:
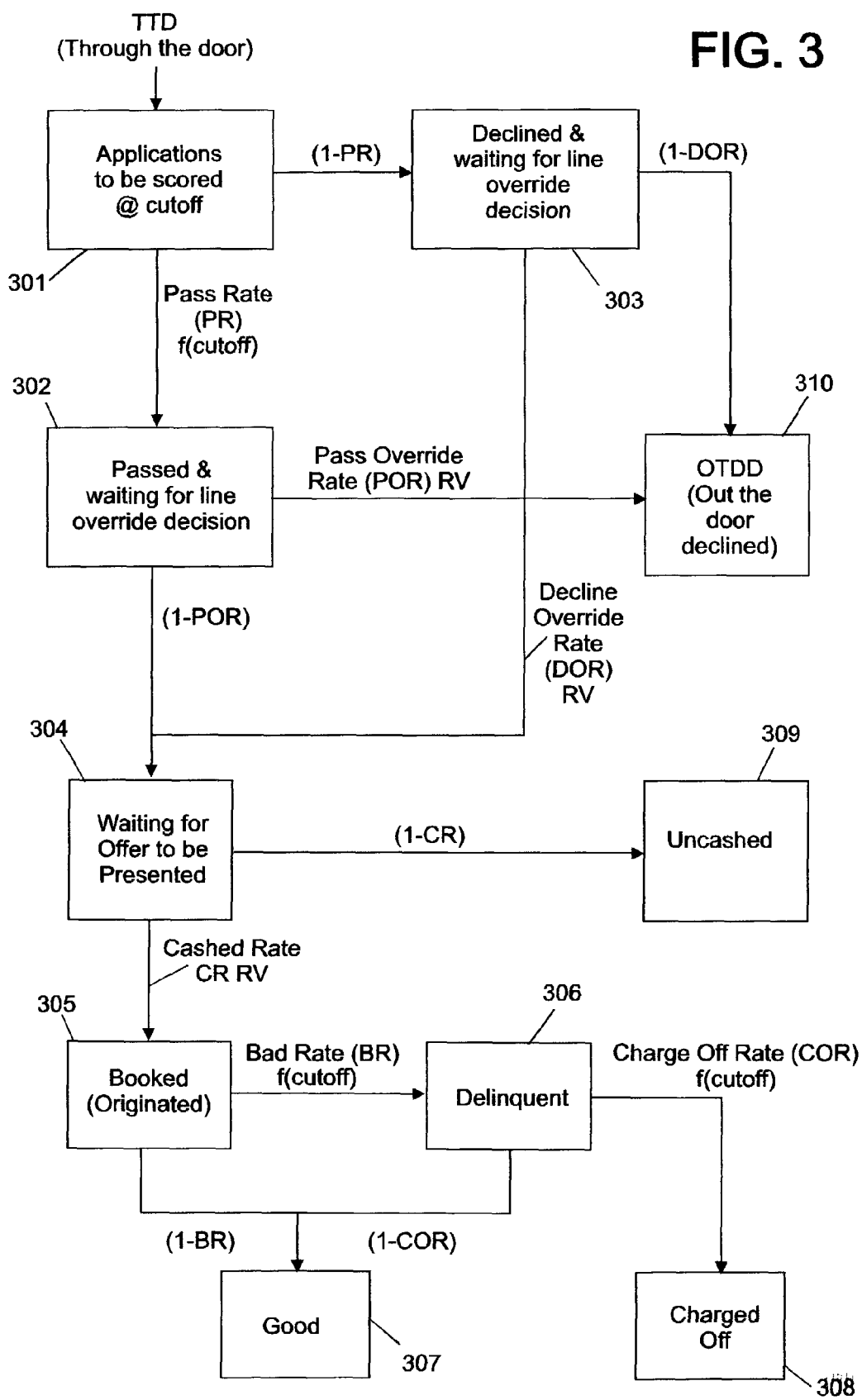
FIG. 3 is a block diagram of an example compartmental workflow model according to embodiments of the invention.

In developing the business model for the bank, ten unique states for credit were identified. Movement from one state to the next can be classified as being the result of a measurable action. In FIG. 3, the process starts when a loan application comes "through the door" or TTD. The compartments show the states that credit can occupy, and the bold compartments show the states where credit can exit the process. Note that some rates of flow between compartments are known based on the scorecard. One is the pass rate (PR) as a function of cutoff score, which is the rate from compartment 301 where an application is scored to compartment 302 where passed application is waiting for an override decision. The flow from compartment 301 to compartment 303, where a failed application is waiting for an override decision is one minus the pass rate. The flow from compartment 305 where an application is booked or originated to compartment 306, where delinquent loan processing takes place, is the bad rate (BR) as a function of cutoff score. The flow from compartment 305 to compartment 307, where the processing of a good loan exits the system is one minus the bad rate. All of the other rates need to be estimated based on data from the bank as part of the workflow analysis. The remaining compartments are 304, where a loan offer is waiting to be presented, 308, where a delinquent loan is charged off, 309, where an uncashed or unused loan is closed, and 310, where declined loans exit, hence they are termed "out the door declined" (OTTD), ABC must be done for each of these compartments leading to a "cost" per unit for each compartment. The term cost is used to represent the desired unit of measure such as profit/loss, shareholder value, or any other accounting formulation. In this example ABC is done so that cost is in terms of profit/loss. It is represented in the model by the ABC template vector:

$$\tilde{C}^{(10)} = [c_1 c_2 c_3 c_4 c_5 c_6 c_7 c_8 c_9 c_{10}]$$

where the subscripts for the vector entries correspond to the reference numbers of FIG. 3, as in entry $c_1$ is for compartment 301, $c_2$ is for compartment 302, etc. First, assume that activity based costing reveals numerical amounts for all the compartments. Assume the cost figures are plugged into the vector equation as follows:

$$\tilde{c}^{(10)}=[-2000\ -1500\ -1500\ -800\ -1700\ -1200\ 4362-10000\ -1400\ -1400]$$

The pass rate, $k_{(p)6,5}{}^s$ and the bad rate, $k_{(b)2,1}{}^s$ have already been discussed relative to the compartmental model of FIG. 3. The other rates that need to be estimated as part of the workflow analysis are defined as follows:

i. Pass override rate (POR) ($k_{10,2}$)—Applications that "passed" the cutoff score, but were declined for other reasons.
 ii. Decline override rate (DOR) ($k_{4,3}$)—Application that "failed" the cutoff score, but were accepted for other reasons.
 iii. Cashed rate (CR) ($k_{5,4}$)—The rate at which applicants use the credit that was granted.
 iv. Chargeoff rate (COR) ($k_{8,6}$)—The rate at which delinquent credit is charged off, or never paid back.

For purposes of this model, the transfer coefficients are assumed to be constant across all cutoff scores, but the transfer coefficients are random variables in the sense that they are estimates based on sample data, calculated as proportions. Assume for this example they are as follows, with their variances also shown:

$$k_{10,2}=0.45$$

$$V(k_{10,2})=0.015$$

$$k_{4,3}=0.05$$

$$V(k_{4,3})=0.00075$$

$$k_{5,4}=0.54$$

$$V(k_{5,4})=0.025$$

$$k_{8,6}=0.65$$

$$V(k_{8,6})=0.0022$$

Even with a proprietary scorecard with limited data, the formulae for the pass and bad rates can be estimated accurately. A best-fit equation can be derived using graphing software, or even a graphing calculator using one of the various algorithms available for curve fitting. For purposes of this example, assume that analyzing the pass rate and bad rate results for a scorecard (not necessarily the one in FIG. 1) yields the following equations for the transfer functions for pass rate and bad rate, respectively:

$$k_{(p)21}{}^s=0.000033s^2-0.020732s+2.92046;$$

$$k_{(b)65}{}^s=0.000016865s^2-0.007246s+0.801421.$$

Following the computation formula for this compartmental model with the estimated transfer coefficients yields the following occupancy vector:

$$\tilde{q}_s = \begin{bmatrix} 1 \\ k_p^s \\ 1-k_p^s \\ 0.5k_p^s + 0.5 \\ 0.27k_p^s + 0.027 \\ 0.27k_p^s k_b^s + 0.027k_b^s \\ -0.1755k_p^s k_b^s + 0.27k_p^s - 0.01755k_b^s + 0.027 \\ -0.1755k_p^s k_b^s + 0.01755k_b^s \\ 0.23k_p^s + 0.023 \\ 0.5k_p^s + 0.95 \end{bmatrix},$$

which represents the proportion of any unit input that will be found in each of the compartments of the model. Note that the sum of what is in compartments 307, 308, 309, and 310 of FIG. 3 is one since they are exit compartments and all credit eventually leaves the system.

The profit function is defined using the computational formula for the profitability model as follows:

$$p(s) = \tilde{c}^{10} \begin{bmatrix} 1 \\ k_p^s \\ 1-k_p^s \\ 0.5k_p^s + 0.05 \\ 0.27k_p^s + 0.027 \\ 0.027k_p^s k_b^s + 0.027k_b^s \\ -0.1755k_p^s k_b^s + 0.27k_p^s - 0.01755k_b^s + 0.027 \\ 0.1755k_p^s k_b^s + 0.01755k_b^s \\ 0.23k_p^s + 0.023 \\ -0.5k_p^s + 0.95 \end{bmatrix},$$

$$p(s) = \begin{bmatrix} c_1 + \\ c_2 k_p^s + \\ c_3(1 - k_p^s) + \\ c_4(0.5k_p^s + 0.05) + \\ c_5(0.27k_p^s + 0.027) + \\ c_6(0.027k_p^s k_b^s + 0.027k_b^s) + \\ c_7(-0.1755k_p^s k_b^s + 0.27k_p^s - 0.01755k_b^s + 0.027) + \\ c_8(0.1755k_p^s k_b^s + 0.01755k_b^s) + \\ c_9(0.23k_p^s + 0.023) + \\ c_{10}(-0.5k_p^s + 0.95) \end{bmatrix}.$$

Collecting the terms that represent the scorecard transfer function allows the separation of the cost coefficients of the ABC analysis from the scorecard transfer coefficient estimates, which are functions of cutoff score. This allows the ABC ratio constant generating function to be factored out, as discussed relative to step 210 of FIG. 2. In addition to providing practical benefits, the model also becomes easier to analyze. Working from the above:

$$p(s)=((0.27c_6-0.1755c_7+0.1755c_8)k_p+0.027c_6-0.01755c_7+0.01755c_8)k_b+(9c_2-1.0c_3+0.5c_4+0.27c_5+0.27c_7+0.23c_9-0.5c_{10})k_p+c_1+c_3+0.05c_4+0.027c_5+0.027c_7+0.023c_9+0.95c_{10}.$$

Factoring out the first two terms of the above equation yields:

$$\frac{0.027c_6 - 0.01755c_7 + 0.01755c_8}{0.27c_6 - 0.1755c_7 + 0.1755c_8} = 0.1 = k_v.$$

Rewriting the previous equation yields:

$p(s) = (0.27c_6 - 0.1755c_7 + 0.1755c_8)(k_p^s + k_v)k_b^s + (c_2 - 1.0c_3 + 0.5c_4 + 0.27c_5 + 0.27c_7 + 0.23c_9 - 0.5c_{10})k_p^s + c_1 + c_3 + 0.05c_4 + 0.027c_5 + 0.027c_7 + 0.023c_9 + 0.95c_{10}.$

Using the following definitions:

$\alpha = 0.27c_6 - 0.1755c_7 + 0.1755c_8,$ $\beta = c_2 - c_3 + 0.5c_4 + 0.27c_5 + 0.27c_7 + 0.23c_9 - 0.5c_{10},$ $\gamma = c_1 + c_3 + 0.05c_4 + 0.027c_5 + 0.027c_7 + 0.023c_9 + 0.95c_{10},$ the profitability function becomes:

$p(s) = k_b^s(k_p^s + k_v)\alpha + \beta k_p^s + \gamma,$ where, $k_p^s = 0.000033s^2 - 0.020732s + 2.92046,$ $k_b^s = 0.000016865s^2 - 0.007246s + 0.801421.$ Since the goal of this process is to maximize profitability, the profitability function must be maximized to yield a maximum profitability function, which is again part of the process of step 210 of FIG. 2. To do this, the derivative of p(s) is taken and set to zero, plugging in the functions immediately above:

$$\frac{d}{ds}(p(s)) = \frac{d}{ds}(k_b^s(k_p^s + k_v)\alpha + \beta k_p^s + \gamma) =$$
$$(0.000066s - 0.020732)\beta + (2.22618 \times 10^{-9}s^3 - 1.7662895 \times 10^{-6}s^2 +$$
$$4.5522205 \times 10^{-4}s - 3.8501313 \times 10^{-2})\alpha = 0.$$

Solving and collecting terms yields:

$$\frac{\alpha}{\beta} = \frac{-0.000066s + 0.020732}{(2.22618 \times 10^{-9}s^3 - 1.7662895 \times 10^{-6}s^2 +}{4.5522205 \times 10^{-4}s - 3.8501313 \times 10^{-2})},$$

which gives the desired result:

$f(\tilde{C}) = g(s),$ where, $$f(\tilde{C}^{(10)}) = \frac{\alpha}{\beta} = \frac{(0.27c_6 - 0.175c_7 + 0.175c_8)}{(c_2 - c_3 + 0.5c_4 + 0.27c_7 + 0.23c_9 - 0.5c_{10})},$$

yielding the maximum profitability function:

$$g(s) = \frac{-0.000066s + 0.020732}{(2.22618 \times 10^{-9}s^3 - 1.7662895 \times 10^{-6}s^2 +}{4.5522205 \times 10^{-4}s - 3.8501313 \times 10^{-2}}.$$

Figure 4:
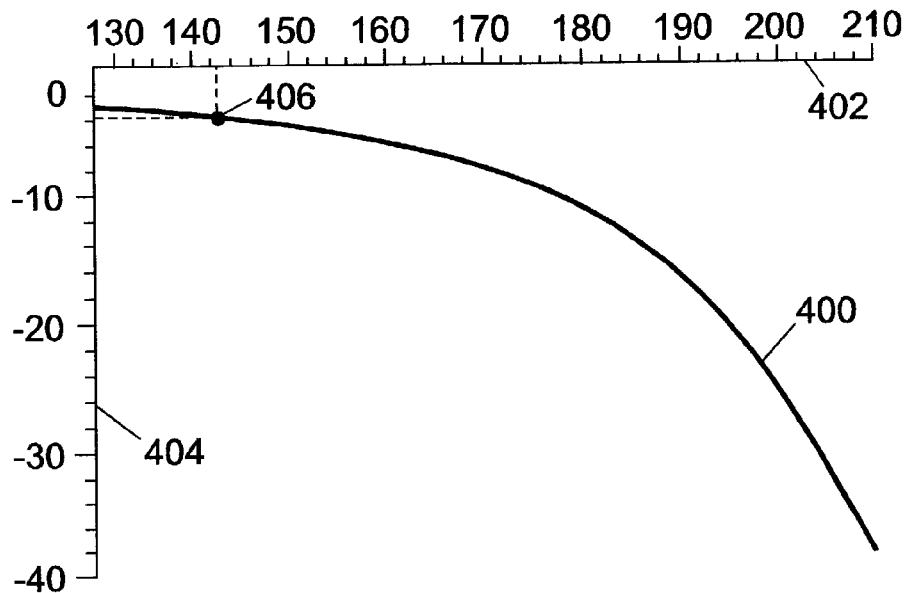
FIG. 4 is an example maximum profitability function curve according to some embodiments of the invention.

The maximum profitability function, above, defines a maximum profitability function curve, or simply, a maximum profitability curve on which a most profitable cutoff score, s, can be found, either manually, or by solving with a computer algorithm. This example curve is pictured in FIG. 4. In FIG. 4, maximum profitability curve 400 is plotted against axis 402 delineating cutoff scores, s, as a function of a constant plotted on axis 404. On this particular example curve, only one cutoff score corresponds to a given constant. With some curves, this may not be the case. If not, an understanding of on which part of the curve the extrema equation is at a true maximum can be gained by taking the second derivative of the profitability function, previously discussed, and setting that to zero, then finding the real-valued intersection of the first and second derivative functions.

The activity based cost (ABC) side of the extrema function evaluates to a ratio which is a constant when all costs are known, and is derived from the coefficients of the particular compartmental model and the particular cost vector for the loan business being analyzed. For this example, the ABC ratio constant generating function is characterized by the following equation:

$$f(\tilde{C}^{(10)}) = \frac{0.29245c_6 - 0.18182c_7 + 0.18182c_8}{c_2 - c_3 + 0.54056c_4 + 0.29245c_5 + 0.29245c_7 + 0.24811c_9 - 0.54056c_{10}}$$

Using the cost vector presented earlier for the ten-compartment model of this example, the above equation evaluates to −3.92. Lookup up this constant on the vertical axis of the graph in FIG. 4 yields the point, 406, which corresponds to a cutoff score of approximately 142. This value represents the most profitable cutoff score for the particular loan business of this model.

There may be situations where a particular cost for the vector $\tilde{C}^{(10)}$ is unknown, however it's dependency on some other variable, say income from the corresponding portion of the loan process in the form of fees, is understood. For example, the cost for compartment 307 in FIG. 3 may be complicated, and difficult to ascertain. As a result the cost for compartment 307 may only be known as a function of income, I. Although it is not possible to use the method of the invention to determine an absolute most profitable score, the affect of income on the profitability can be determined, and conclusions about what cutoff scores should be selected given various income scenarios can be drawn.

For example, assume the cost for compartment 307, $c_7$, is known to be income minus 3000. Then, the ABC cost vector becomes:

$\tilde{C}^{(10)} = [-2000 -1500 -1500 -800 -1700 -1200\ I-3000 -10000 -1400 -1400]$ The ABC ratio can still be determined from the ABC constant generating function, but instead of being a constant the ABC ratio will be a function of/as follows:

$$f(C_{(10)}) = f(I) = \frac{-1623.68 - 0.18182I}{-1397.533 + 0.29245I}.$$

Figure 5:
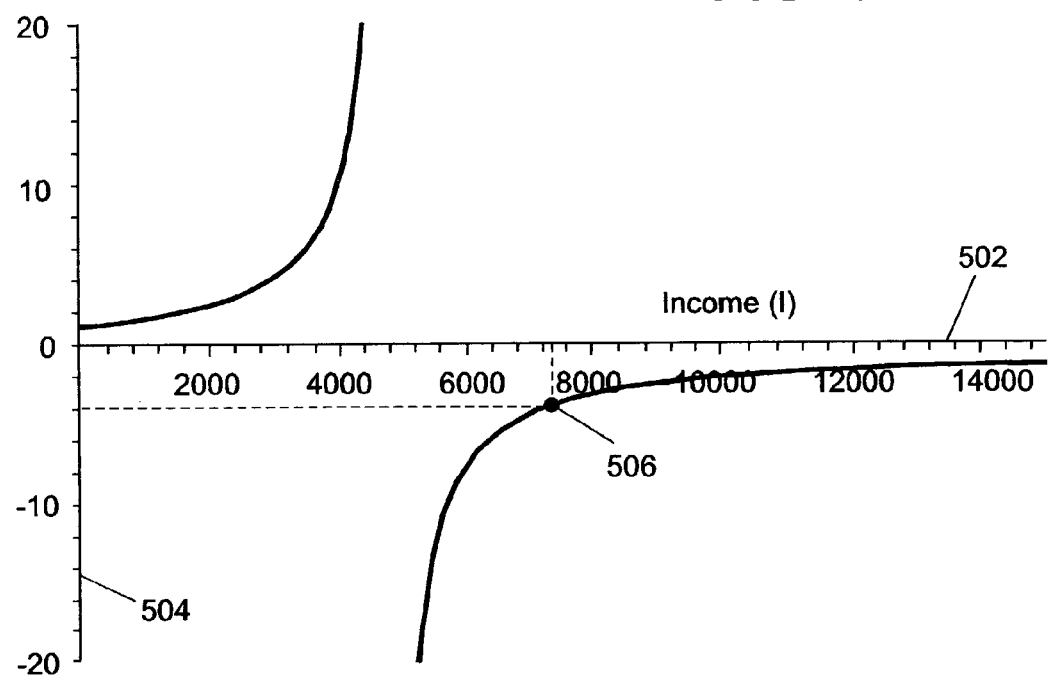
FIG. 5. illustrates the ABC ratio as a function of the income of a loan process of the example of FIG. 3, which can be informative in cases where a one or more of the costs needed to generate the ratio are not known.

This function is plotted in FIG. 5. Income is plotted on axis 502, and the constant is shown on axis 504. Using this graph, the most profitable cutoff score for various incomes can be determined by looking up the constant and looking it up on a graph like that of FIG. 5. A plot showing the affect of income on the most profitable cutoff score could also be developed. Note that in the immediately proceeding example ABC ratio constant 3.92 corresponds to an income of roughly 7362, at point 506 on the graph. Also note that if these figures are plugged in to the profitability function, it can be observed that in this particular example, maximizing profit is actually minimizing loss. The particular cost numbers and coefficient values will depend on the specifics of the loan business being analyzed, so this of course will not always be the case.

Figure 6:
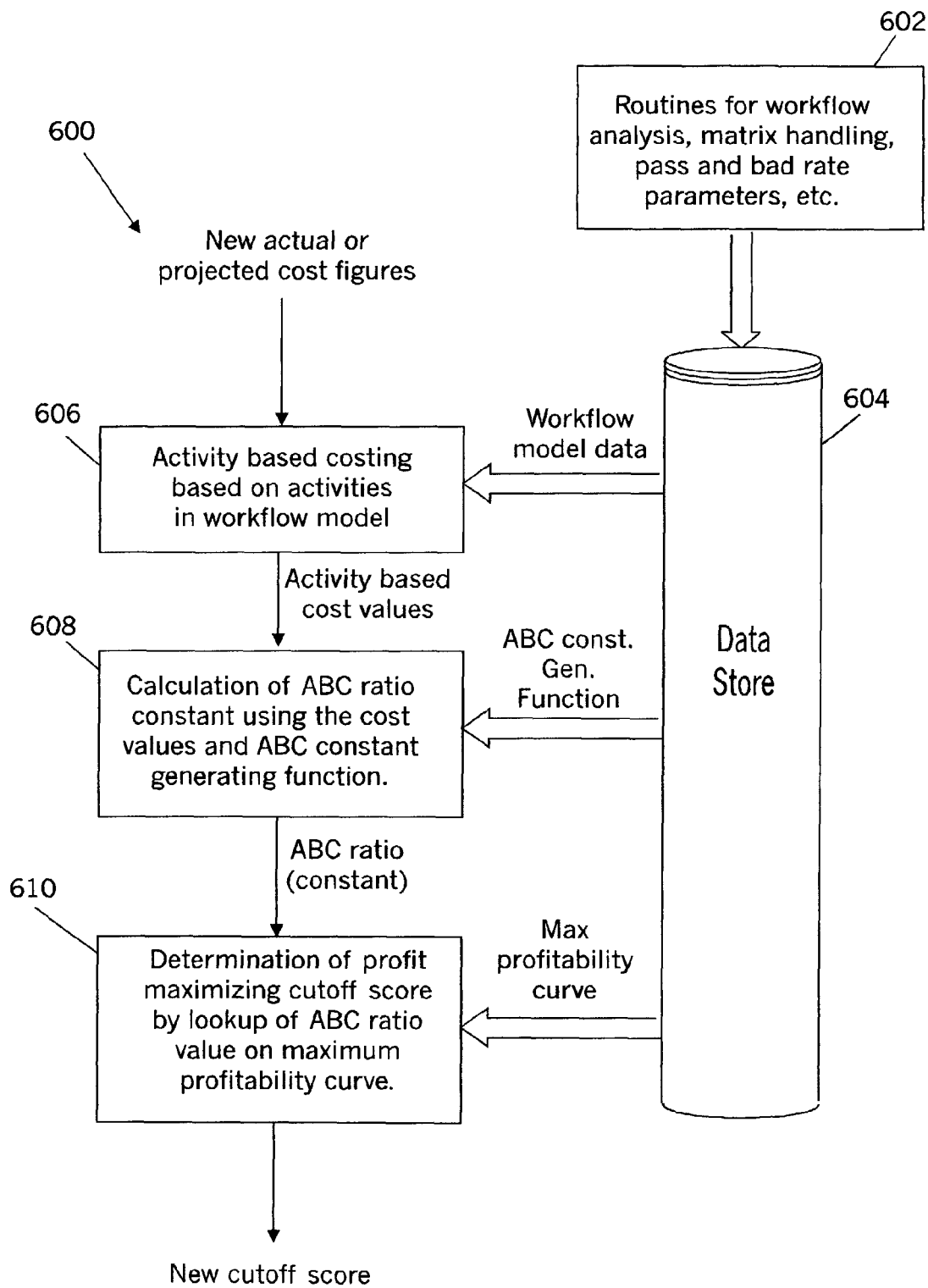
FIG. 6 is a combination block and flow diagram illustrating the operation of one embodiment of a system that implements the invention.

FIG. 6 is a combination block and flow diagram showing how a practical system, 600, can be implemented to carry out embodiments of the invention in an actual business environment. Routines 602 can be run once for a specific scorecard and workflow. These routines, in some embodiments, form a software subsystem for analyzing the workflow model, determining the pass and bad rate parameters for the scorecard, and generally, arriving at and storing the maximum profitability function curve and ABC constant generating function for a particular workflow and scorecard. If there is more than one scorecard for this particular workflow (perhaps for different dollar ranges, types of loans etc.), data pertaining to each scorecard is derived. In a large enterprise, data for multiple loan business might be stored and indexed. Note that where pass and bad rates are functions of cutoff score, scorecard data must be input here for regression analysis to determine the rate functions. This data could be manually input; however, if scorecards are acquired in electronic format, it is a simple matter for one skilled in the programming arts to create a routine to read the scorecard data into the subsystem. In FIG. 6, data describing the ABC constant generating function and maximum profitability function are stored in data store 604.

The second set of routines or second subsystem of FIG. 6 is shown broken into some of its constituent parts. These correspond to the portions of the process of FIG. 2 that appear in box 212. These include the activity based costing, 606, the calculation of the ABC ratio (usually a constant) at 608, and the final determination of the most profitable cutoff score from the maximum profitability curve at 610. As is shown, the second subsystem routines access workflow model data, the ABC constant generating function, and the maximum profitability function from data store 604. This system allows a new cutoff score to be determined for a business whenever costs change, with a minimum of processing. Only the ABC costing part of the method of the invention need be run, as data from the calculations for the particular workflow and particular scorecard in question is already stored.

Figure 7:
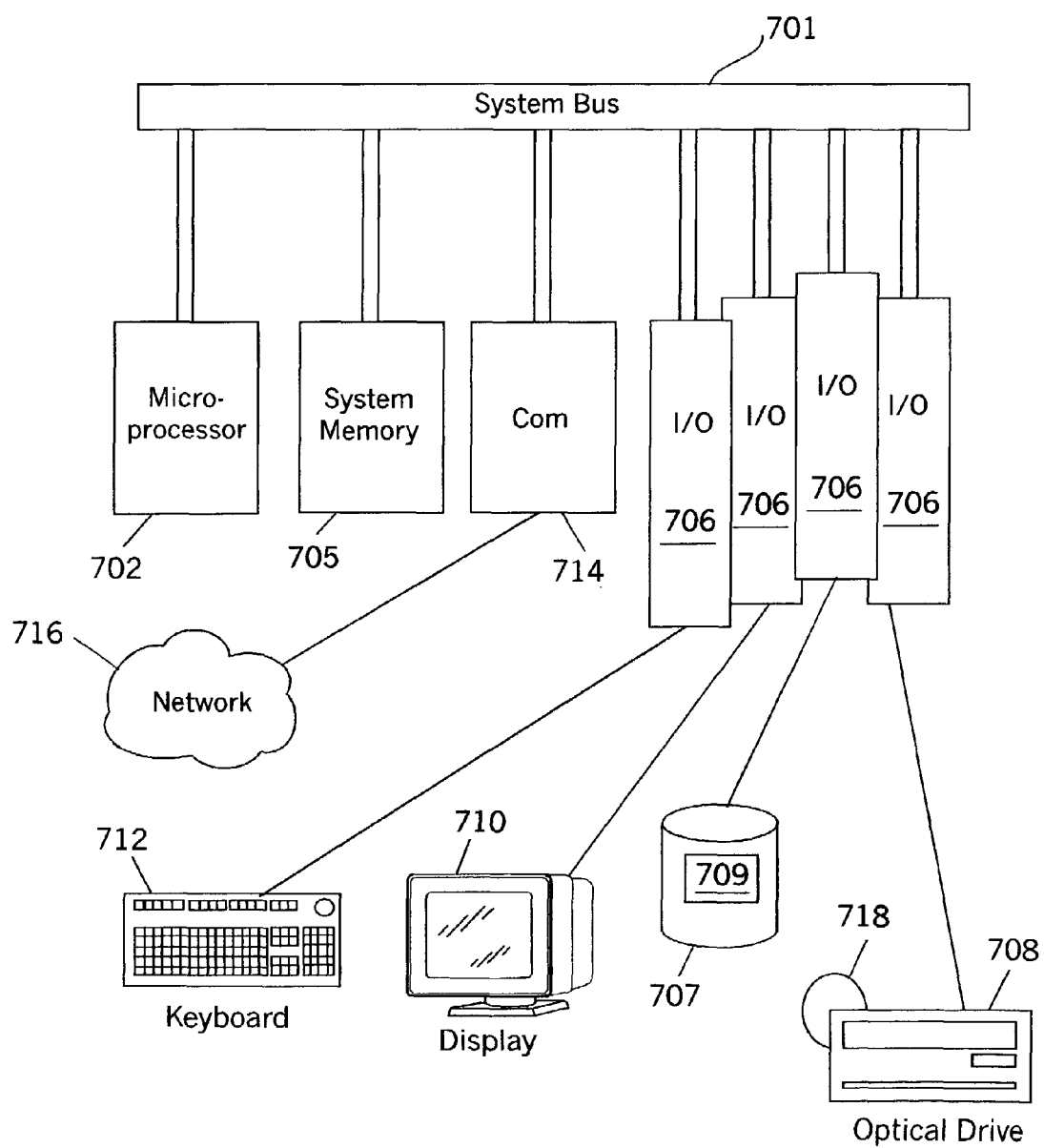
FIG. 7 is a block diagram of an embodiment of computer, processing, or instruction execution platform that is implementing at least a portion of the invention.

FIG. 7 illustrates an instruction execution system, personal computer, or workstation that can serve to implement all of our portions of embodiments of the invention. It should also be noted that one workstation could can implement all aspects of the invention. However, it is equally plausible to implement one subsystem of routines on one workstation, and the other on another workstation. The data store can reside on either of these, or on yet another system, and the subsystems residing on the various computing systems and/or workstations can be interconnected via a network such as the Internet, a local area network (LAN) or an intranet. FIG. 7 illustrates the detail of the computer system that is programmed with application software to implement functions of the invention. System bus 701 interconnects the major components. The system is controlled by microprocessor 702, which serves as the central processing unit (CPU) for the system. System memory 705 is typically divided into multiple types of memory or memory areas such as read-only memory (ROM), and random access memory (RAM). A plurality of standard input/output (I/O) adapters or devices, 706, is present. A typical system can have any number of such devices; only four are shown for clarity. These connect to various devices including a fixed disk drive, 707, and a removable optical media drive, 708. Computer program code instructions for implementing the appropriate functions, 709, are stored on the fixed disk, 707. This fixed disk can also hold the data store discussed with respect to FIG. 6. When the system is operating, the instructions are partially loaded into memory, 705, and executed by microprocessor 702. Additional I/O devices in this example include display, 710 and keyboard 712.

A workstation implementing only a portion of the invention will contain an network or local area network (LAN) communication adapter, 714, to connect to the network, 716. Any of these adapters should be thought of as functional elements more so than discrete pieces of hardware. A workstation or personal computer could have all or some of the adapter entities implemented on one circuit board. It should be noted that the system of FIG. 7 is meant as an illustrative example only. Numerous types of general-purpose computer systems and workstations are available and can be used. Available systems include those that run operating systems such as Windows™ by Microsoft, various versions of UNIX™, various versions of LINUX™, and various versions of Apple's Mac™ OS.

Computer program elements of the invention may be embodied in hardware and/or in software (including firmware, resident software, micro-code, etc.). As shown above, the invention may take the form of a computer program product, which can be embodied by a computer-usable or computer-readable storage medium having computer-usable or computer-readable program instructions or "code" embodied in the medium for use by or in connection with the instruction execution system. In addition to the fixed disk drive already discussed, such a medium is pictured in FIG. 7 with its removable drive, optical disk 718. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and the hardware described in FIG. 7 form the various means for carrying out the functions of the invention in example embodiments.

Specific embodiments of an invention are described herein. One of ordinary skill in the computing and accounting arts will quickly recognize that the invention has other applications in other environments. In fact, many embodiments and implementations are possible. The following claims are in no way intended to limit the scope of the invention to the specific embodiments described above.

I claim:

1. A method of determining a credit decision cutoff score for use in a credit decisioning process, the method comprising:
   determining a compartmental workflow model for the credit decisioning process;
   determining rate parameters based at least partially on a credit scorecard;
   determining, based at least partially on the rate parameters and the compartmental workflow model, an occupancy matrix;

determining, using a computer and based at least partially on the occupancy matrix, a maximum profitability function and an activity based costing (ABC) ratio generating function, wherein the maximum profitability function defines a maximum profitability curve;

determining, using a computer and based at least partially on the ABC ratio generating function and activity based costing of one or more activities in the compartmental workflow model, an ABC ratio;

determining the credit decision cutoff score by locating the ABC ratio on the maximum profitability curve; and outputting the credit decision cutoff score using an output device.

2. The method of claim 1 further comprising:

determining, based at least partially on the rate parameters and the compartmental workflow model, a transfer coefficient matrix, and wherein the determining the maximum profitability function and the ABC ratio generating function comprises:

determining, using a computer and based at least partially on the transfer coefficient matrix and the occupancy matrix, a profitability function; and maximizing, using a computer, the profitability function while factoring out the ABC ratio generating function.

3. The method of claim 1 wherein the determining the rate parameters further comprises performing regression analysis on the credit scorecard.

4. The method of claim 2 wherein the determining the rate parameters further comprises performing regression analysis on the credit scorecard.

5. The method of claim 1 further comprising repeating the determining the ABC ratio and the determining the credit decision cutoff score when one or more costs of one or more activities in the compartmental workflow model change.

6. The method of claim 2 further comprising repeating the determining the ABC ratio and the determining the credit decision cutoff score when one or more costs of one or more activities in the compartmental workflow model change.

7. The method of claim 3 further comprising repeating the determining the ABC ratio and the determining the credit decision cutoff score when one or more costs of one or more activities in the compartmental workflow model change.

8. The method of claim 4 further comprising repeating the determining the ABC ratio and the determining the credit decision cutoff score when one or more costs of one or more activities in the compartmental workflow model change.

9. A computer program product comprising a non-transitory computer-readable storage medium having computer-readable program code embodied therein, the computer-readable program code to be executed on a computer to implement a method for determining a credit decision cutoff score for use in a credit decisioning process, the method comprising:

determining a compartmental workflow model for the credit decisioning process;

determining rate parameters based at least partially on a credit scorecard;

determining, based at least partially on the rate parameters and the compartmental workflow model, an occupancy matrix;

determining, based at least partially on the occupancy matrix, a maximum profitability function and an activity based costing (ABC) ratio generating function, wherein the maximum profitability function defines a maximum profitability curve;

determining, based at least partially on the ABC ratio generating function and activity based costing of one or more activities in the compartmental workflow model, an ABC ratio;

determining the credit decision cutoff score by locating the ABC ratio on the maximum profitability curve; and outputting the credit decision cutoff score using an output device.

10. The computer program product of claim 9 wherein the method further comprises:

determining, based at least partially on the rate parameters and the compartmental workflow model, a transfer coefficient matrix, and wherein the determining the maximum profitability function and the ABC ratio generating function comprises:

determining, based at least partially on the transfer coefficient matrix and the occupancy matrix, a profitability function; and maximizing the profitability function while factoring out the ABC ratio generating function.

11. The computer program product of claim 9 wherein the determining the rate parameters further comprises performing regression analysis on the credit scorecard data.

12. The computer program product of claim 10 wherein the determining the rate parameters further comprises performing regression analysis on the credit scorecard data.

13. The computer program product of claim 9 wherein the method further comprises:

storing information associated with the compartmental workflow model, information associated with the maximum profitability function, and information associated with the ABC ratio generating function;

determining one or more new activity based costs for one or more activities in the compartmental workflow model; and determining, based at least partially on the information associated with the compartmental workflow model, the information associated with the maximum profitability function, the information associated with the ABC ratio generating function, and the one or more new activity based costs, a new credit decision cutoff score.

14. The computer program product of claim 10 wherein the method further comprises:

storing information associated with the compartmental workflow model, information associated with the maximum profitability function, and information associated with the ABC ratio generating function;

determining one or more new activity based costs for one or more activities in the compartmental workflow model; and determining, based at least partially on the information associated with compartmental workflow model, the information associated with the maximum profitability function, the information associated with the ABC ratio generating function, and the one or more new activity based costs, credit decision cutoff score.

15. The computer program product of claim 11 wherein the method further comprises:

storing information associated with the compartmental workflow model, information associated with the maximum profitability function, and information associated with the ABC ratio generating function;

determining one or more new activity based costs for one or more activities in the compartmental workflow model; and determining, based at least partially on the information associated with compartmental workflow model, the information associated with the maximum profitability function, the information associated with the ABC ratio generating function, and the one or more new activity based costs, a new credit decision cutoff score.

16. The computer program product of claim 12 wherein the method further comprises:
storing information associated with the compartmental workflow model, information associated with the maximum profitability function, and information associated with the ABC ratio generating function;
determining one or more new activity based costs for one or more activities in the compartmental workflow model; and
determining, based at least partially on the information associated with compartmental workflow model, the information associated with the maximum profitability function, the information associated with the ABC ratio generating function, and the one or more new activity based costs, a new credit decision cutoff.

17. The computer program product of claim 9 wherein the determining the ABC ratio further comprises:
determining that the ABC ratio equals a constant; and
determining that the ABC ratio equals a function of another variable of a compartment in the compartmental workflow model.

18. The computer program product of claim 10 wherein the determining the ABC ratio further comprises:
determining that the ABC ratio equals a constant; and
determining that the ABC ratio equals a function of another variable of a compartment in the compartmental workflow model.

19. The computer program product of claim 11 wherein the determining the ABC ratio further comprises:
determining that the ABC ratio equals a constant; and
determining that the ABC ratio equals a function of another variable of a compartment in the compartmental workflow model.

20. The computer program product of claim 12 wherein the determining the ABC ratio further comprises:
determining that the ABC ratio equals a constant; and
determining that the ABC ratio equals a function of another variable of a compartment in the compartmental workflow model.

21. The computer program product of claim 13 wherein the determining the ABC ratio further comprises:
determining that the ABC ratio equals a constant; and
determining that the ABC ratio equals a function of another variable of a compartment in the compartmental workflow model.

22. The computer program product of claim 14 wherein the determining the ABC ratio further comprises:
determining that the ABC ratio equals a constant; and
determining that the ABC ratio equals a function of another variable of a compartment in the compartmental workflow model.

23. The computer program product of claim 15 wherein the determining the ABC ratio further comprises:
determining that the ABC ratio equals a constant; and
determining that the ABC ratio equals a function of another variable of a compartment in the compartmental workflow model.

24. The computer program product of claim 16 wherein the determining the ABC ratio further comprises:
determining that the ABC ratio equals a constant; and
determining that the ABC ratio equals a function of another variable of a compartment in the compartmental workflow model.

25. An apparatus for determining a credit decision cutoff score for use in a credit decisioning process, the apparatus comprising:
a processor configured to:
determine a compartmental workflow model for the credit decisioning process;
determine, based at least partially on information from a credit scorecard and the compartmental workflow model, a transfer coefficient matrix;
determine, based at least partially on the transfer coefficient matrix, a maximum profitability function and an activity based costing (ABC) ratio generating function, wherein the maximum profitability function defines a maximum profitability curve;
determine, based at least partially on the ABC ratio generating function and activity based costing of one or more activities in the compartmental workflow model, an ABC ratio;
determine the credit decision cutoff score by locating the ABC ratio on the maximum profitability curve; and
an output device operatively connected to the processor and configured to output the credit decision cutoff score.

26. The apparatus of claim 25, wherein the processor is configured to:
store, in a datastore operatively connected to the processor, information associated with the compartmental workflow model, information associated with the maximum profitability function, and information associated with the ABC ratio generating function;
determine one or more new activity based costs for one or more activities in the compartmental workflow model; and
determine, based at least partially on the information associated with the compartmental workflow model, the information associated with the maximum profitability function, the information associated with the ABC ratio generating function, and the one or more new activity based costs, a new credit decision cutoff score.

27. The apparatus of claim 25, wherein the processor is configured to:
determine that the ABC ratio equals a constant; and
determine that the ABC ratio equals a function of another variable of a compartment in the compartmental workflow model.

28. The apparatus of claim 26, wherein the processor is configured to:
determine that the ABC ratio equals a constant; and
determine that the ABC ratio equals a function of another variable of a compartment in the compartmental workflow model.

29. A system for determining a credit decision cutoff score for use in a credit decisioning process, the system comprising:
a first subsystem configured to:
determine a compartmental workflow model for the credit decisioning process;
determine, based at least partially on information from a credit scorecard and the compartmental workflow model, a transfer coefficient matrix and an occupancy matrix; and
determine, based at least partially on the transfer coefficient matrix and the occupancy matrix, a maximum profitability curve and an activity based costing (ABC) ratio generating function;
a data store operatively connected to the first subsystem and configured to store the ABC ratio generating function and the maximum profitability curve;

a second subsystem operatively connected to the data store and configured to:
  receive one or more activity based costs for one or more activities in the compartmental workflow model;
  access the ABC ratio generating function and the maximum profitability curve from the data store; and
  determine, based at least partially on the one or more activity based costs, the ABC ratio generating function, and the maximum profitability curve, the credit decision cutoff score; and
an output device operatively connected to the second subsystem and configured to output the credit decision cutoff score.

30. The system of claim 29 wherein the data store is configured to store a plurality of ABC ratio generating functions and maximum profitability curves corresponding to a plurality of credit scorecards.

31. The system of claim 30 wherein the data store is operatively connected to the first subsystem and the second subsystem via a network.

32. The system of claim 31 wherein the first subsystem, the data store, and the second subsystem are distributed across at least two nodes of the network.

* * * * *